Figure 1:
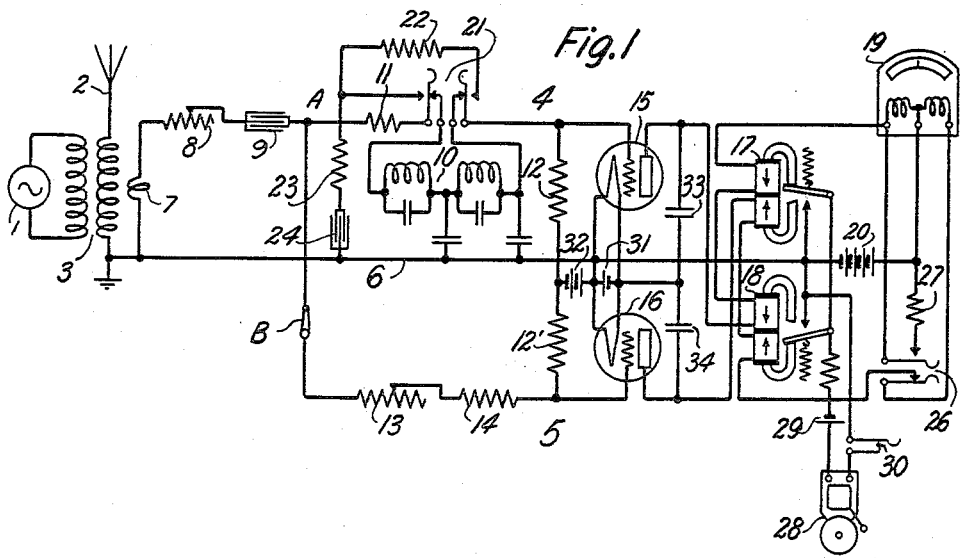

April 6, 1926.                    1,579,320
J. L. HYSKO
FREQUENCY INDICATING SYSTEM
Filed July 2, 1925

Inventor:
John L. Hysko
by  J.G. Roberts  Atty.

Patented Apr. 6, 1926.

1,579,320

UNITED STATES PATENT OFFICE.

JOHN L. HYSKO, OF BROOKLYN, NEW YORK, ASSIGNOR TO WESTERN ELECTRIC COMPANY, INCORPORATED, A CORPORATION OF NEW YORK.

FREQUENCY-INDICATING SYSTEM.

Application filed July 2, 1925. Serial No. 40,989.

*To all whom it may concern:*

Be it known that I, JOHN L. HYSKO, a citizen of the United States of America, residing at Brooklyn, in the county of Kings and State of New York, have invented certain new and useful Improvements in Frequency-Indicating Systems, of which the following is a full, clear, concise, and exact description.

This invention relates to the measurement of the frequency of electric waves and more particularly to the precise indication of small changes in frequency.

A frequency indicating system in connection with which the invention finds application is disclosed in the copending application of Maurice B. Long, Serial No. 696,772, filed March 4, 1924. In that system the departure of a wave from a fixed normal frequency is determined by comparing the intensities of two currents received after being transmitted through separate channels having different transmission characteristics such that the two currents are equal at the normal frequency. The indication is confined to a narrow range of frequencies above and below the normal, and with proper proportioning of the apparatus an extremely sensitive indication of small frequency variations may be secured.

The need for extremely sensitive frequency measuring systems has become pressing with the advent of radio broadcasting and the establishment of a great number of broadcasting stations whose waves may differ in frequency by as little as 10,000 c. p. s. At the lower broadcasting frequencies this interval is slightly greater than 1% and at the high frequencies it is considerably less than 1% of the wave frequency. To prevent interference between the waves of the various broadcasting stations it is necessary that the waves be held within about 1,000 c. p. s. of their assigned frequencies, which means that the frequency ratio with reference to which the wave frequency is adjusted must be capable of a sensitivity of at least .05% and be reliably accurate to the same degree.

The system of the aforementioned copending application of M. B. Long permits an extremely high degree of sensitivity to be reached. By means of the present invention, a like degree of accuracy may also be secured.

An object of the invention is therefore to secure an increased accuracy in the determination of the frequency of high frequency waves.

A further object is to facilitate the setting of generators of high frequency waves to generate waves of an accurately fixed frequency.

In the frequency determining systems in connection with which the use of the invention is contemplated a normal frequency is determined by the selective transmission characteristics of one or more networks. These networks comprise impedance elements, inductances, capacities, and resistances, which, with the proper selection of magnitudes and of the materials of construction may be made so stable in their properties that the fixed frequency determined by their characteristics will be constant within .01% under all ordinary conditions.

The degree of accuracy is therefore inherent in the networks but to secure sensitivity of the indications it is generally necessary to employ amplifying or detecting devices and to arrange more or less complex circuits for the comparison of the tested frequency with the standard, in consequence of which, much of the inherent accuracy may be lost.

In accordance with the present invention the measuring circuit is so arranged that the effects of changes in the sensitivity of the amplifying devices and other circuit elements may be readily determined and compensated when a measurement is made.

The nature of the invention and its operation will be fully understood from the following detailed description which is to be read in conjunction with the accompanying drawing, of which—

Figure 2:
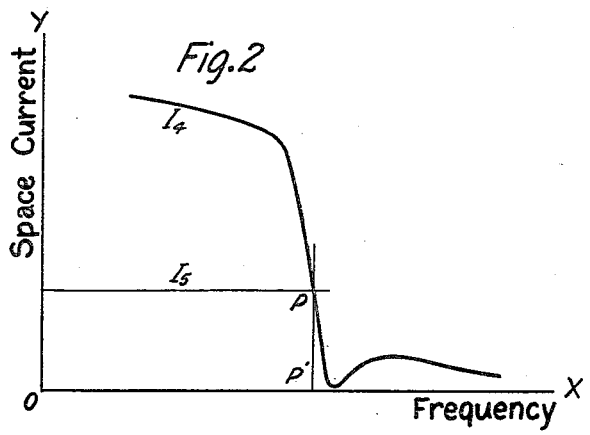

Fig. 1 shows in schematic form a frequency measuring system embodying the invention; and Fig. 2 is a theoretical diagram to illustrate the mode of operation of the system of Fig. 1.

Referring to Fig. 1, the system is illustrated in connection with a radio transmitter, the wave frequency of which it is arranged to measure and indicate.

The radio transmitter is indicated in elementary schematic by a generator 1 and a radiating antenna 2 to which the generator is connected b means of the coupling transformer 3.

The measuring system comprises two wave transmission channels 4 and 5 which have one conductor 6 in common. The two channels are connected together at point A to a common input circuit comprising a coupling coil 7, a regulating resistance 8 and an isolating condenser 9. Coil 7 serves to induce an E. M. F. in the measuring circuit corresponding to the wave radiating from antenna 2 to which the coil is very loosely coupled.

Channel 4 includes an attenuating network, consisting of a low-pass wave filter 10, a series resistance 11, and a shunt resistance 12. Channel 5 includes a second attenuating network constituted solely by resistance elements of which there are two series elements 13 and 14 and a shunt element 12'. The low-pass filter in channel 4 produces an attenuation of the waves in that channel which is variable with frequency, whereas the resistive elements in channel 5 cause a uniform attenuation at all frequencies.

The remainder of the apparatus is alike in both channels, and comprises space discharge detectors 15 and 16, of the customary three electrode type, and polarized differential relays 17 and 18, one winding of each of which is connected in series in each channel.

Each channel terminates in one winding of a differential ammeter 19 of the central zero type, the junction point of the two windings of which is connected through a space current source, 20, for the detectors, to the common conductor 6.

In channel 4 a key 21 is provided by means of which the low-pass filter 10 may be cut out of circuit and replaced by a constant attenuation network comprising resistances 22 and 23 and a large capacity 24. A second key 26 is included in channel 5 to disconnect the winding of the meter 19 normally connected in that channel, and to connect simultaneously a resistance 27 in shunt to the other winding. With key 26 operated the meter 19 gives an indication proportional to the output current of channel 4.

The polarized relays 17 and 18 are so arranged that the operation of either one of them closes an alarm circuit in which is included a bell 28, a battery 29, and an alarm cutoff key 30.

Detectors 15 and 16 are supplied with space current from the source 20 through the windings of the meter 19 and of the relays 17 and 18 in all of which the two space currents neutralize each other when the circuit is in an idle condition. Battery 31 furnishes heating current for the detector filaments, and battery 32 supplies a polarizing potential to the control electrodes. The purpose of condensers 9 and 24 is merely to prevent a drain of current from battery 32 and their capacities should therefore be large so that their impedances are negligible at operating frequencies.

The detectors function as plate-circuit demodulators, that is, the demodulation products appear as E. M. F.'s generated in the space path of the detector by virtue of the curvilinear relationship that exists between the control electrode potential and the space current. The demodulation products include a zero frequency component which is of such sign that the space current increases as the wave E. M. F. on the input terminals is increased.

This steady component is used to provide the frequency indications, the alternating output currents of the detectors being absorbed in shunt condensers 33 and 34.

In the operation of the system the impressed waves after traversing the alternating networks in the two channels produce E. M. F.'s across the terminals of resistances 12 and 12', the relative magnitudes of which depend upon the degrees of attenuation of the wave in each channel. Corresponding changes take place in the space currents of detectors 15 and 16 and the pointer of meter 19 is deflected to right or to left depending upon which space current is the larger.

Since the attenuating network of channel 5 is conposed of resistances only the E. M. F. impressed on the detector, and hence the space current, in that channel is practically independent of the wave frequency.

In channel 4, however, the E. M. F. impressed on the detector is strongly dependent upon the frequency particularly in the range near the cut-off frequency of the low-pass filter 10. For low frequencies the E. M. F. impressed on detector 15 is the larger and for high frequencies it is the smaller. At some intermediate frequency the two E. M. F.'s are approximately equal and the detector space currents are exactly equal, so that the meter 19 shows zero deflection.

The nature of the space current variation with frequency in the two channels is shown in Fig. 2, in which the curve $I_4$ corresponds to the space current of detector 15 and the straight line $I_5$ corresponds to the current of detector 16. The sharpness of the variation of the current $I_4$ due to the rapid rise of the filter attenuation in the neighborhood of the cut-off frequency is clearly indicated. The frequency at which the meter reads zero is indicated by the point at which the vertical line PP', passing through the intersection P of the curves, cuts the frequency axis.

It is evident that this critical frequency does not depend solely on the relative attenuations of the networks in the two channels, but depends also on the detecting sensitivities of the two detectors and to a small extent on constants of the detector output circuits.

The relative sensitivities of the detectors may change if the voltage of any one of the three batteries 20, 31 and 32 changes and is practically sure to suffer a substantial change if one or other of the detectors should burn out and be replaced. Since it it desired that the zero reading of the indicating meter shall always correspond to the same fixed frequency it is necessary that means be provided to compensate the effects of the changes in the less stable circuit elements.

In the system of the invention this means comprises the resistance combination 22, 23 and key 21 by means of which the resistances are substituted for the low-pass filter. These resistances, which form a series shunt combination, are proportioned, in a manner to be described later, so that when the wave frequency has the correct normal value, the substitution of the resistances for the filter produces no change in the voltages at the branch point A and at the terminals of resistance 12. This corresponds to proportioning both the attenuation and the impedance of the resistive network, the two-fold adjustment being made possible by the provision of the two independent branches.

The method of using this standardizing network is as follows: Key 21 is operated to substitute the resistance network for the filter. Key 26 is operated to disconnect channel 5 from the indicating meter and the deflection of the meter is noted. Resistance 8 may now be varied until a certain arbitrarily predetermined deflection is obtained corresponding to a predetermined constant voltage at the branch point of the two channels. The input voltage having been adjusted, key 26 is thrown to normal, thereby introducing the output current of channel 5 into the differential meter. Ordinarily the two currents will be unbalanced giving a finite deflection of the meter index, which may be brought to zero by adjusting the variable resistance 13.

The two channels are now equalized and as the attenuating networks in both are made up of resistances the equalization is independent of the frequency. Since, by virtue of its initial adjustment, the resistance network 22, 23 may be substituted at one particular frequency for the wave filter without causing any change in the voltages of the system, it follows that, when key 21 is restored to normal, the two channels will be exactly equalized if the frequency has that particular value, and the indicating meter will show zero deflection.

If the impressed wave does not have the correct frequency the meter will be deflected to right or to left, the one direction indicating that the frequency is too high, and the other that it is too low.

By establishing a fixed input voltage as described above, the deflection of the meter may be calibrated in terms of the frequency difference from the normal frequency.

If the departure from the normal frequency exceeds a predetermined amount, for example 1000 C. P. S., the alarm signal controlled by relays 17 and 18 operates. These relays are biased in opposite senses and their contacts are normally held open. An excess of current in channel 4 causes relay 17 to operate, thereby closing the alarm circuit, and an excess of current in channel 5 causes relay 18 to operate.

The initial adjustment of resistances 22 and 23 may be determined by computation from the constants of the filter elements, assuming that these are accurately known. This method, however, is extremely laborious and the laboratory method to be described is much to be preferred.

In carrying out the experimental adjustment it is necessary to measure the wave E. M. F. between the branch point A and conductor 6 and also the E. M. F. across resistance 12. The latter may be measured by the deflection of meter 19 when key 26 is operated; the former may be measured by inserting a thermo-couple ammeter in series with resistance 13 at a point such as B. The test wave may be standardized accurately by well known methods to the desired normal frequency by reference to a more fundamental frequency standard.

The condition it is desired to reach is that neither voltage indicating instrument should show any change of indication when the key 21 is successively operated and restored.

Each resistance controls both voltages to some extent, but it will be found that the indication of the voltage at point A is more strongly controlled by the shunt resistance 23 whereas resistance 22 strongly controls the voltage across resistance 12. By making a number of successive approximations the final adjustment may be reached with any desired degree of accuracy.

Since the system must be calibrated at the normal frequency by reference to another frequency standard it does not constitute a fundamental frequency standard, but is, rather, a secondary standard which possesses a high degree of accuracy in combination with marked simplicity in its method of use.

What is claimed is:

1. A frequency indicating system comprising a pair of transmission channels connected in parallel at their input ends to a common circuit including a wave source, and connected in opposition at their output ends to a differential indicating instrument, a frequency selective network included in one of said channels, a second network included in the other channel having attenuation which is independent of frequency but adjustable in degree, a third network also having attenuation which is independent of frequency and which is proportioned to be equal to that of said selective network at a single predetermined frequency, and switching means for disconnecting said selective network from the system and substituting said third network in place thereof.

2. A frequency indicating system comprising a pair of transmission channels connected in parallel at their input ends to a common circuit including a wave source, and connected in opposition at their output ends to a differential indicating instrument, a frequency selective network included in one of said channels, a second network included in the other channel having attenuation which is independent of frequency but adjustable in degree, a third network also having attenuation which is independent of frequency and switching means for disconnecting said selective network from the system and substituting said third network in place thereof, said third network being so proportioned, with respect to characteristics to said selective network at a single predetermined frequency, that its substitution for said selective network produces an equal transmission loss at said frequency.

3. A frequency indicating system comprising a pair of transmission channels connected in parallel at their input ends to a common input circuit including a wave source, and connected in opposition at their output ends to a differential indicating instrument, a detecting device in each channel for producing direct currents corelated in magnitude to the intensity of waves impressed thereon, a frequency selective network included in one of said channels, a second network of resistance elements proportioned to produce in the system a constant transmission loss equal at one predetermined frequency to the loss produced by said selective network, switching means for substituting said resistance network for said selective network in the system, and a third network in the other of said channels comprising resistive elements, at least one of which is adjustable, whereby the over all transmission losses of the two channels may be equalized at said predetermined frequency.

4. A frequency indicating system comprising a pair of transmission channels in which are included wave detectors, input terminals and output terminals for said channels, said input terminals being connected to a common input circuit including a wave source, and said output terminals being connected to a differential indicating instrument, a low-pass wave filter of fixed characteristics included in one of said channels; a resistance network in the other of said channels including a variable resistance, whereby the over all transmission loss of said other channel may be varied, a third network of fixed resistances, and switching means whereby said third network may be substituted for said low-pass filter in the system to provide a transmission standard which is independent of frequency and in accordance with which the over all transmission losses of the two channels may be adjusted to desired relative values.

In witness whereof, I hereunto subscribe my name this 26 day of June, A. D. 1925.

JOHN L. HYSKO.